(12) United States Patent
Toma et al.

(10) Patent No.: US 6,573,659 B2
(45) Date of Patent: Jun. 3, 2003

(54) SOLAR-POWERED LIGHT ASSEMBLY WITH AUTOMATIC LIGHT CONTROL

(75) Inventors: Ion Toma, Vancouver (CA); Zbigniew Siemiatkowski, North Vancouver (CA); Lysle Brock Russell, Vancouver (CA)

(73) Assignee: Carmanah Technologies, Inc., Victoria ( * ) Notice: Subject to any disclaimer, the term of this patent is extended or adjusted under 35 U.S.C. 154(b) by 0 days.

(21) Appl. No.: 09/824,994

(22) Filed: Apr. 2, 2001

(65) Prior Publication Data

US 2002/0053879 A1 May 9, 2002

Related U.S. Application Data

(60) Provisional application No. 60/193,377, filed on Mar. 31, 2000.

(51) Int. Cl.[7] .......................... H05B 37/02; F21V 19/02
(52) U.S. Cl. ........................................ 315/149; 362/372
(58) Field of Search ................................ 315/149, 156, 315/157, 158, 159; 362/183, 194, 362, 372, 800

(56) References Cited

U.S. PATENT DOCUMENTS

| | | | |
|---|---|---|---|
| 4,751,622 A | 6/1988 | Williams | 362/183 |
| 5,055,984 A * | 10/1991 | Hung et al. | 136/291 |
| 5,221,891 A * | 6/1993 | Janda et al. | 136/293 |
| 5,367,442 A * | 11/1994 | Frost et al. | 136/291 |
| 5,713,655 A * | 2/1998 | Blackman | 200/312 |
| 5,782,552 A | 7/1998 | Green et al. | 362/183 |
| 6,013,985 A | 1/2000 | Green et al. | 315/149 |
| 6,120,165 A * | 9/2000 | Shalvi | 315/149 |
| 6,290,367 B1 * | 9/2001 | Greenhoe et al. | 362/183 |

* cited by examiner

Primary Examiner—Don Wong
Assistant Examiner—Minh D A
(74) Attorney, Agent, or Firm—Kolisch Hartwell, P.C.

(57) ABSTRACT

A solar-powered light assembly comprising at least one light-emitting diode (LED) powered by a rechargeable battery, a solar panel to recharge the battery and to sense light levels, and control circuitry to monitor the rechargeable battery at intervals. At the start of an interval, preferably, the transition from night to day, the control circuitry sets the at least one LED to output light at a pre-determined level based on the battery voltage at the start of the interval. This control scheme is used to adjust the LED output to the available solar illumination recharging the battery to ensure reliable and efficient operation.

16 Claims, 6 Drawing Sheets

SOLAR-POWERED LIGHT ASSEMBLY WITH AUTOMATIC LIGHT CONTROL

CROSS REFERENCE TO RELATED APPLICATIONS

This application claims priority under 35 U.S.C. §119(e) to U.S. Provisional Patent Application No. 60/193,377 entitled "Solar-Powered Light Assembly With Automatic Light Control," filed Mar. 31, 2000, the disclosure of which is incorporated herein by reference.

FIELD OF THE INVENTION

This invention relates to a solar powered light assembly with automatic control of light output to adjust the output to accommodate the solar illumination available for recharging of assembly.

BACKGROUND OF THE INVENTION

Commonly owned U.S. Pat. No. 6,013,985 issued Jan. 11, 2000 and entitled "SEALED SOLAR-POWERED LIGHT ASSEMBLY", the disclosure of which is incorporated herein by reference, describes a permanently sealed solar-powered hazard light. The assembly uses a light emitting diode (LED) as an illumination source and offers dramatically improved reliability and vandal-resistant solar powered lighting by incorporating all the components of a solar-powered light into a single sealed unit. However, the single greatest inefficiency of this design is that the electronics must be optimised for the worst solar conditions that the light assembly is likely to encounter. In practical terms, this means that the light must be designed for the worst of the winter months when ambient light available for recharging the light assembly is lowest. The result is that in the summer, the light assembly operates relatively inefficiently, as the unit is unable to use much of the energy available for capture by the solar panels. Similarly, unless each light assembly is set up individually, there is no means of adjusting the light output level of the assembly to the installation location. For example, a light assembly used in Egypt, where there are 6 hours of sunlight on average every day, will have the same light output as a light assembly used in Patagonia which has only one hour of sunlight available per day to recharge the unit. The light used in Egypt therefore has a large inefficiency in which at least eighty percent of the incoming solar energy is not used.

SUMMARY OF THE INVENTION

Accordingly, there is a need for a lighting unit that that is able to automatically adjust its light output in response to the solar energy available to charge the light battery.

The present invention provides a solar-powered light assembly comprising:
- at least one light-emitting diode (LED) powered by a rechargeable battery;
- a solar panel to recharge the battery and to sense light levels; and
- control circuitry to monitor the rechargeable battery at intervals and, at the start of an interval, set the at least one LED to output light at a pre-determined level based on the battery voltage at the start of said interval.

The present invention also provides a method of controlling a solar-powered light assembly having at least one light-emitting diode (LED) powered by a rechargeable battery and a solar panel to recharge the battery and to sense light levels, comprising the steps of:
- monitoring the rechargeable battery at intervals;
- setting the at least one LED to output light at a pre-determined level at the start of an interval based on the battery voltage at the start of said interval.

The apparatus and method of the present invention rely on a control system that determines the charge received by the batteries during the day from the solar panel which is dependent on ambient light levels, and uses this information to determine and set the light output level of the LEDs. By automatically altering the light output level, the light assembly of the present invention can produce its maximum light output during the summer months and then can reduce its output during the winter months when ambient light levels decline. This automatic light output control ensures that the light assembly continues to function reliably despite wide variations in solar illumination available to recharge the batteries. It also allows a single model of the solar-powered light assembly to be shipped to any location in the world, since the control scheme allows the light assembly to adapt to the ambient light levels available at its location adjusting the assembly's light output level to be in balance with the solar energy available for recharging of the batteries.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
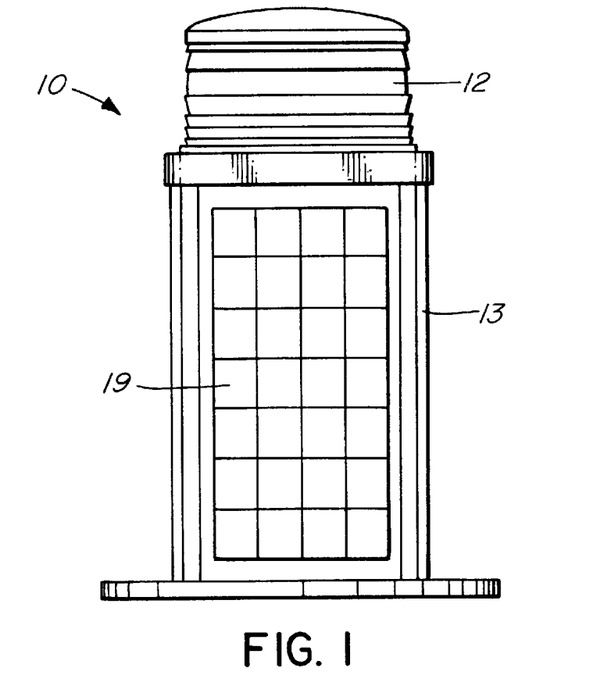
FIG. 1 is a side view of a light assembly according to the present invention.
Figure 2:
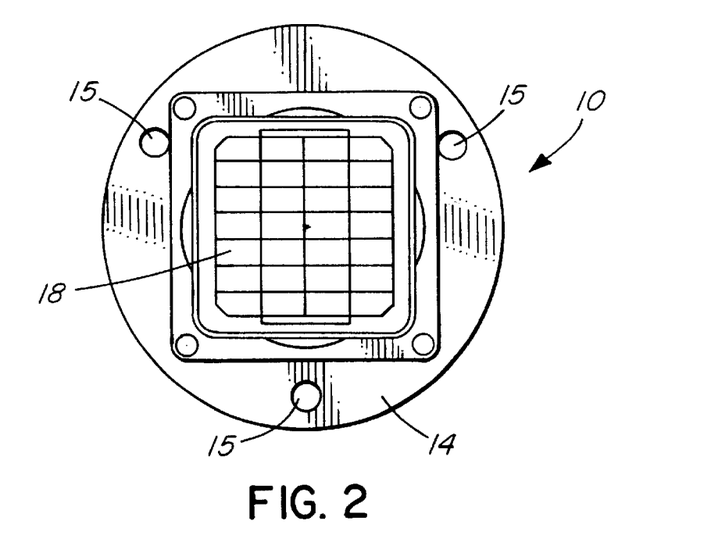
FIG. 2 is a top view of the light assembly shown in FIG. 1.

A solar-powered light assembly 10 according to a preferred embodiment of the present invention is shown in FIGS. 1 and 2. The light assembly has a lens 12 mounted on top of a housing 13. The assembly includes a base 14 for mounting to a desired location using theft-proof screws or the like extending through holes 15. Solar panel 18 is mounted on top of lens 12 and solar panels 19 are mounted to the sides of housing 13 to sense ambient light levels and capture solar energy in order to provide energy to charge the light assembly.

Figure 3:
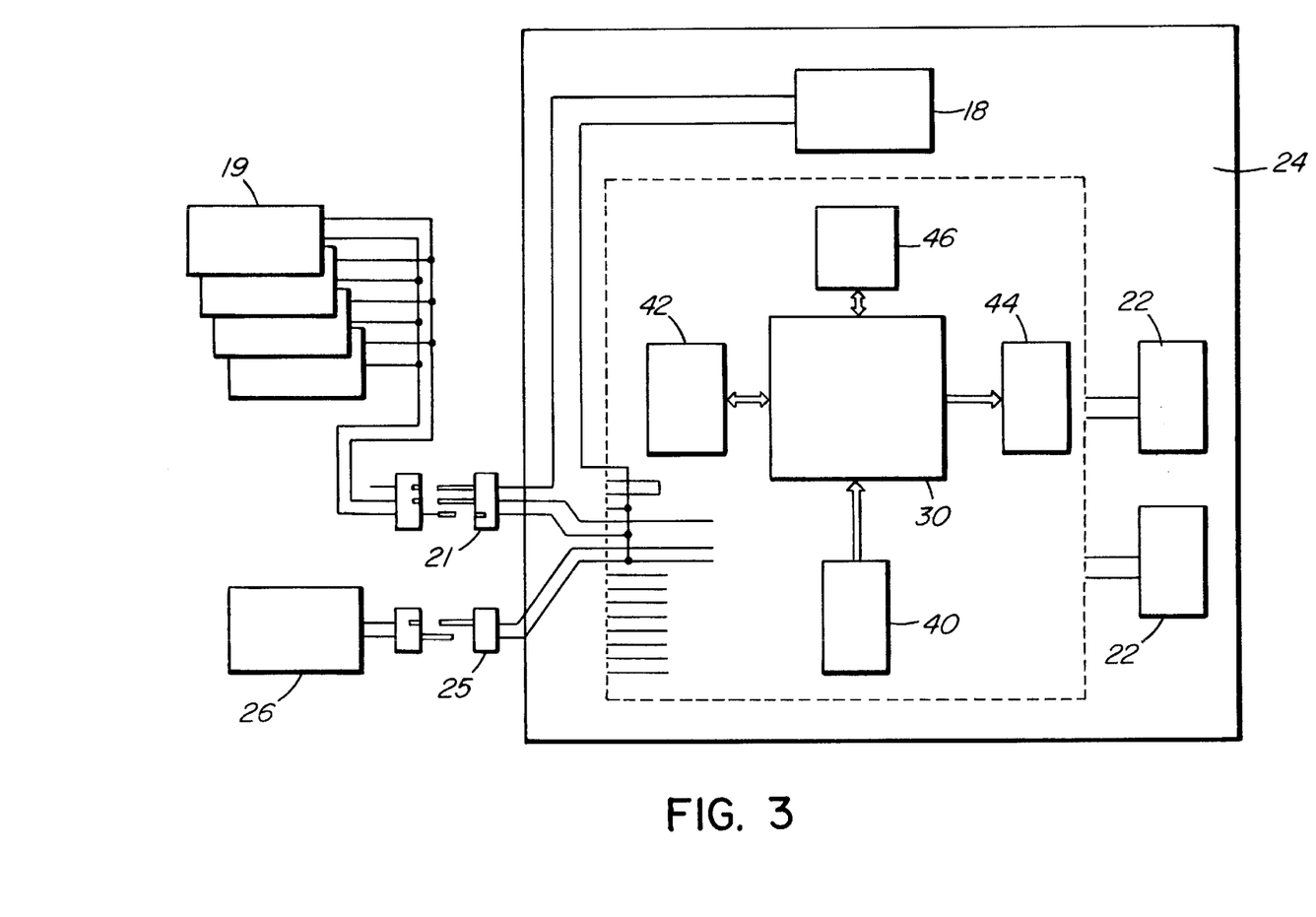
FIG. 3 is a circuit diagram for a light assembly according to a preferred embodiment of the present invention.

Housing 13 contains one or more light emitting diodes (LEDs) 22, preferably arranged in arrays, connected to a circuit board 24 that includes the control circuitry for the light assembly (FIG. 3). The number of LEDs may be varied depending upon the size of the light assembly. Different light assemblies may be designed for different applications.

Housing 13 also houses rechargeable battery pack 26 connectable to the circuit board via connector 25. Solar panels 18 and 19 are connectable to circuit board 24 via connectors 21. The solar panels charge battery pack 26 which in turn provides power to LEDs 22. Preferably, each of the solar panels comprises an array of photovoltaic cells configured in series or parallel to provide sufficient voltage and current to charge the batteries of pack 26. Battery pack 26 preferably has more than one cell although in some circumstances a single battery cell will suffice.

Preferably, housing 13 is formed with a one-way valve 17 to provide a means for venting the interior of the housing in the event of over-heating of the battery cells.

Circuit board 24 includes the control circuitry for the unit that permits automatic adjustment of the LED output according to the solar illumination available for recharging the battery. Circuit board 24 includes microprocessor 30 which runs the necessary control algorithms.

During operation of the light assembly, LEDs 22 preferably pulse or flash at the light output level set by the control circuitry. Flash pattern memory 46 stores one or more flash patterns.

Regulator circuitry 42 is included on circuit board 24 to perform various housekeeping functions. Regulator circuitry 42 includes battery management functions to ensure that the batteries are correctly charged to promote maximum life and prevent excessive charging. The regulator circuitry includes a timer function that ensures that the light assembly will turn off automatically after more than 20 hours of continuous operation to ensure that the light will turn off during storage. In conjunction with solar panels 18, 19, the regulator circuitry provides automatic on-off control that switches the LEDs off when the ambient light is above a pre-set level and activates the LEDs when the ambient light is below a pre-set level. Preferably, regulator circuitry 42 is set to ensure that the LEDs output light at a maximum level at the transition from day to night (dusk) when visibility is poorest.

A remote control sensor 40 and associated control circuitry are preferably provided to permit adjustment or testing of the light assembly. Control sensor 40 can be an infra-red or radio frequency sensor for activation by an appropriate remote control unit. Signals from the control unit can perform such remote functions as turning the light assembly on and off, adjusting the on-off ambient light levels, selecting the LED flash pattern to be used from flash pattern memory 46, and detecting the status of the rechargeable battery.

A constant current power supply 44 is also provided to ensure that the LEDs produce a relatively constants, stabilised light output regardless of battery voltage.

Figure 4:
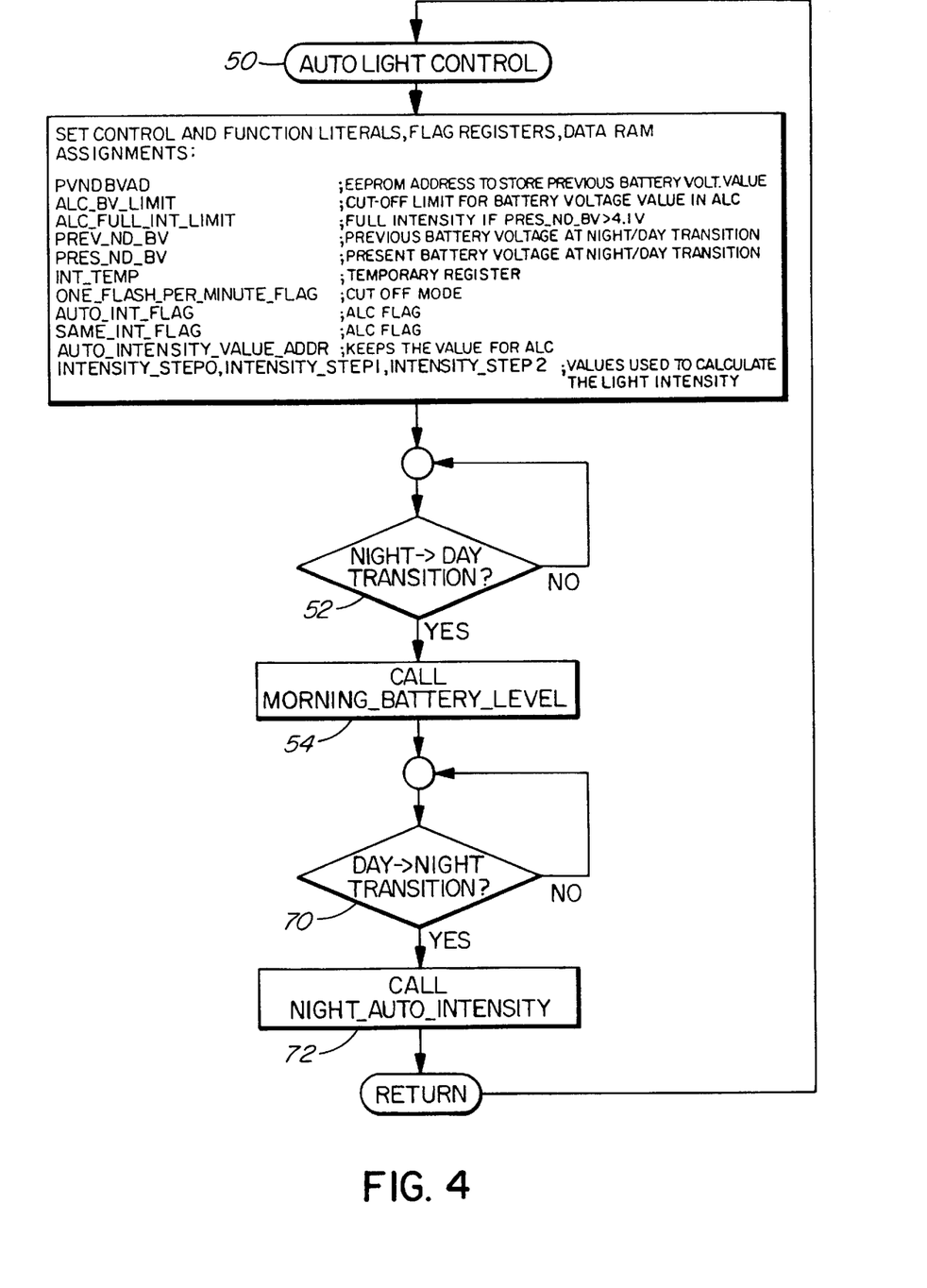
FIGS. 4, 4a, and 4b are block diagrams of the algorithms used to control the light output of the light assembly.
Figure 4A:
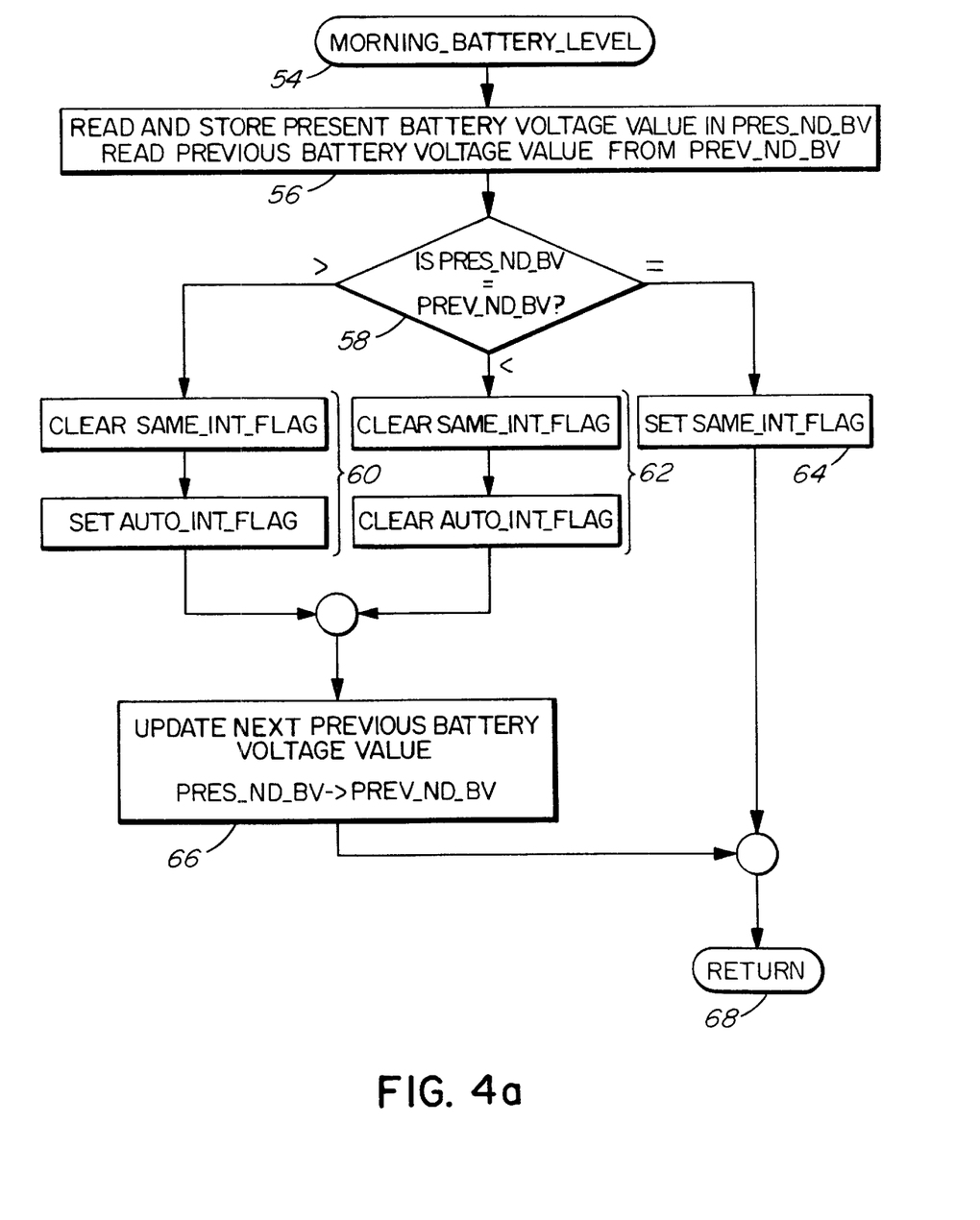
Figure 4B:
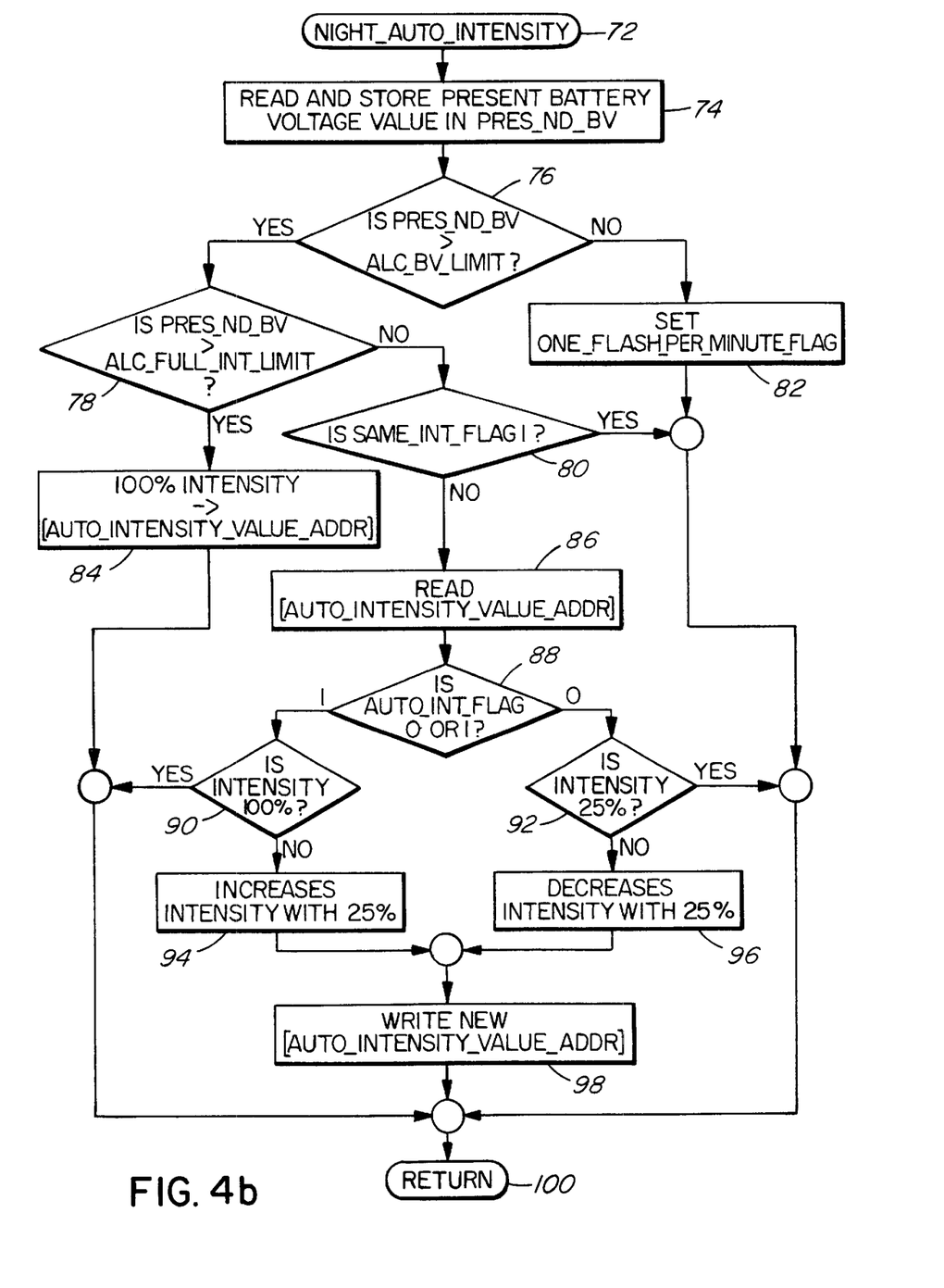

FIGS. 4, 4a, and 4b illustrate schematically the control algorithm that governs the operation of the light assembly of the present invention. The light assembly relies on a basic control scheme that monitors the rechargeable battery at intervals and, at the start of an interval, sets the LEDs to output light at a pre-determined level based on the battery voltage at the start of the interval. The battery monitoring interval is preferably the time between the transition from night to day (dawn) every 24 hours. The control scheme achieves the necessary reliability and efficiency of operation by pulsing the light emitting diodes (LEDs) comprising the light source of the assembly in a flash pattern having a duty cycle above the flicker fusion frequency to reduce power consumption. The duty cycle is varied based on the following parameters:

Charge state of the battery
On-time of the flash pattern in use
Hours of operation in a night The charge state of the battery provides a means for determining the solar illumination that the light assembly has received. The on-time and hours of operation determine the load on light assembly. The control circuitry calculates the appropriate duty cycle that the light assembly can maintain. While the assembly may produce less than full light output after recharging during periods of low solar illumination, it is very unlikely to turn off completely, and it is therefore more reliable than conventional lighting which will cease illumination when the light bulb burns out or when electrical current is cut off.

Referring to FIG. 4, there is shown a preferred overall control algorithm AutoLightControl (ALC) 50 which runs on microprocessor 30 and monitors various parameters and stores them in memory. The monitored parameters and flag registers include:

PVNDBVAD: eeprom address to store previous battery voltage value

ALC_BV_LIMIT: cut-off battery voltage limit below which battery will not operate ALC_FULL_INT_LIMIT: full intensity limit for battery voltage PREV_ND_BV: Previous battery voltage at night/day transition PRES_ND_BV: Present battery voltage at night/day transition INT_TEMP: temporary register One_Flash_Per_Minute_Flag: flag to set low-power operation mode of light assembly Auto_Int_Flag: flag set to increment or decrement output level of LEDs Same_Int_Flag: flag set to maintain output level of LEDs Auto_Intensity_Value_Addr: address for value of current LED output level Intensity_Step0, Intensity_Step1, Intensity_Step2: values use to calculate LED output level The ALC algorithm initially monitors the ambient light levels via solar panels 18, 19 at step 52 to determine if the transition from night to day (dawn) has occurred. If NO, the algorithm continues to monitor ambient light levels. If dawn is detected, the algorithm calls the Morning_Battery_Level subroutine 54.

Referring to FIG. 4a, the Morning_Battery_Level subroutine measures the present voltage of battery pack 26 and stores the value in PRES_ND_BV at step 56. The value PREV_ND_BV which stores the value of the battery pack voltage measured at the previous dawn is also read at step 56. The present measured battery voltage value is compared to the previous stored value in step 58.

If the present measured battery voltage is greater than the previous stored value, a flag Auto_Int_Flag is set at step 60 to increase the output level of the LEDs by a pre-determined amount, unless a maximum output level is already set. A flag Same_Int_Flag is also cleared.

If the present measured battery voltage is less than the previous stored value, the flag Auto_Int_Flag is cleared at step 62 to decrease the output level of the LEDs by a pre-determined amount, unless a minimum output level is already set. The flag Same_Int_Flag is also cleared.

If the present measured battery voltage is the same as the previous stored value within a pre-determined range, the flag Same_Int_Flag is set to maintain the output level of the LEDs as shown in step 64.

At step 66, the present measured battery voltage is stored in PREV_ND_BV to update the previous stored battery value and complete the subroutine Morning_Battery_Level. Control is returned to the main program at step 68.

Effectively, the Morning_Battery_Level subroutine 54 determines if the battery pack 26 is showing stress from insufficient charging. The night to day transition to measure determine battery status was chosen for three reasons:

the battery is under a steady load during the night the temperature is as uniform as possible at this time the effect of the complex charging pattern during the day is eliminated and the battery voltage is at load conditions During the day, the battery pack is charged by solar panels 18, 19. Depending on the weather conditions, the battery pack may be charged to the maximum extent possible at 100 percent sunlight (60,000 to 100,000 lux) or may be minimally charged due to very foggy weather or a cloudy day (2000 lux or lower).

Referring back to FIG. 4, the control algorithm monitors ambient light at step 70 during the day to determine if the transition from day to night (dusk) has occurred. If NO, the algorithm continues to monitor ambient light levels. If dusk is detected, the algorithm calls the Night_Auto_Intensity subroutine 72.

Referring to FIG. 4b, the Night_Auto_Intensity subroutine reads and stores the present battery voltage in PRES_ND_BV at step 74. The present battery voltage value is compared to the ALC_BV_LIMIT at step 76. The ALC_BV_LIMIT is the cut-off limit for the battery voltage below which the battery will not function to provide power to the LEDs. For example, in the case of a battery pack containing 4 Volt rechargeable batteries, the battery cut off level is set to 3.8 Volts. If the present battery voltage is lower than the cut-off voltage then the light assembly is placed in low battery mode at step 82 by setting the One_Flash_Per_Minute_Flag. In low battery mode, the LEDs are set to flash for 10 msec every minute to indicate that the light assembly is fully functional but has not had enough sunlight to charge the battery pack. The light assembly will remain in low battery mode until subsequent charging raises the present battery voltage above a voltage of 4.05 volts at which point the LEDs are set at the 25% output level and the light assembly resumes normal operation.

If the present battery voltage is greater than the cut-off voltage, then the present battery voltage is compared the full intensity limit for the battery voltage ALC_FULL_INT_LIMIT in step 78. In the case of 4 volt batteries, the full intensity limit is 4.1 volts. If the present battery voltage is greater than the ALC_FULL_INT_LIMIT value of 4.1 volts, the Auto_Intensity_Value_Addr memory address, which stores the value of the output level of the LEDs, is set at 100% at step 84.

If the present battery voltage is less than the ALC_FULL_INT_LIMIT, the value of Same_Int_Flag is checked at step 80. If the flag is set indicating that the present battery voltage is the same as the previous battery voltage, the Auto_Intensity_Value_Addr is left unchanged and the LEDs will continue to operate at the same output level as the previous night. The battery voltage is considered the same if the voltage falls within a error band. In the present embodiment, if the difference in voltages is equal to or less than 22 millivolts, the voltages are considered to be the same as 22 mV represents the A/D resolution after scaling of the components of the light assembly.

If there has been a change in the present battery voltage, the Same_Int_Flag will be cleared and the algorithm will branch to step 86 in which the existing Auto_Intensity_Value_Addr storing the LED output level is read from memory.

The value of Auto_Int_Flag is examined in step 88. If the flag is set, indicating that the present battery voltage was greater than the stored battery voltage, the Auto_Intensity_Value_Addr is incremented by a pre-determined amount at step 94 after first checking at step 90 whether the output level is already at the maximum. The various pre-determined amounts are stored in the registers Intensity_Step0, Intensity_Step1, etc. If the flag is clear, indicating that the present battery voltage was less than the stored battery voltage, the Auto_Intensity_Value_Addr is decremented by the pre-determined amount at step 96 after first checking at step 92 whether the output level is already at the minimum. As a final step, the new output level is written to memory at step 98 and the Night_Auto_Intensity subroutine returns control at step 100 to the overall AutoLightControl algorithm which sets the light assembly into operation by flashing the LEDs at the output level stored in Auto_Intensity_Value_Addr.

In the present embodiment, the Auto_Intensity_Value_Addr is varied over 4 steps such that the LEDs can be set to operate at 25%, 50%, 75% and 100% light output levels depending on the charge state of the battery pack. It will be appreciated that other pre-determined levels can be used and plugged into the algorithm of the present invention.

Figure 5:
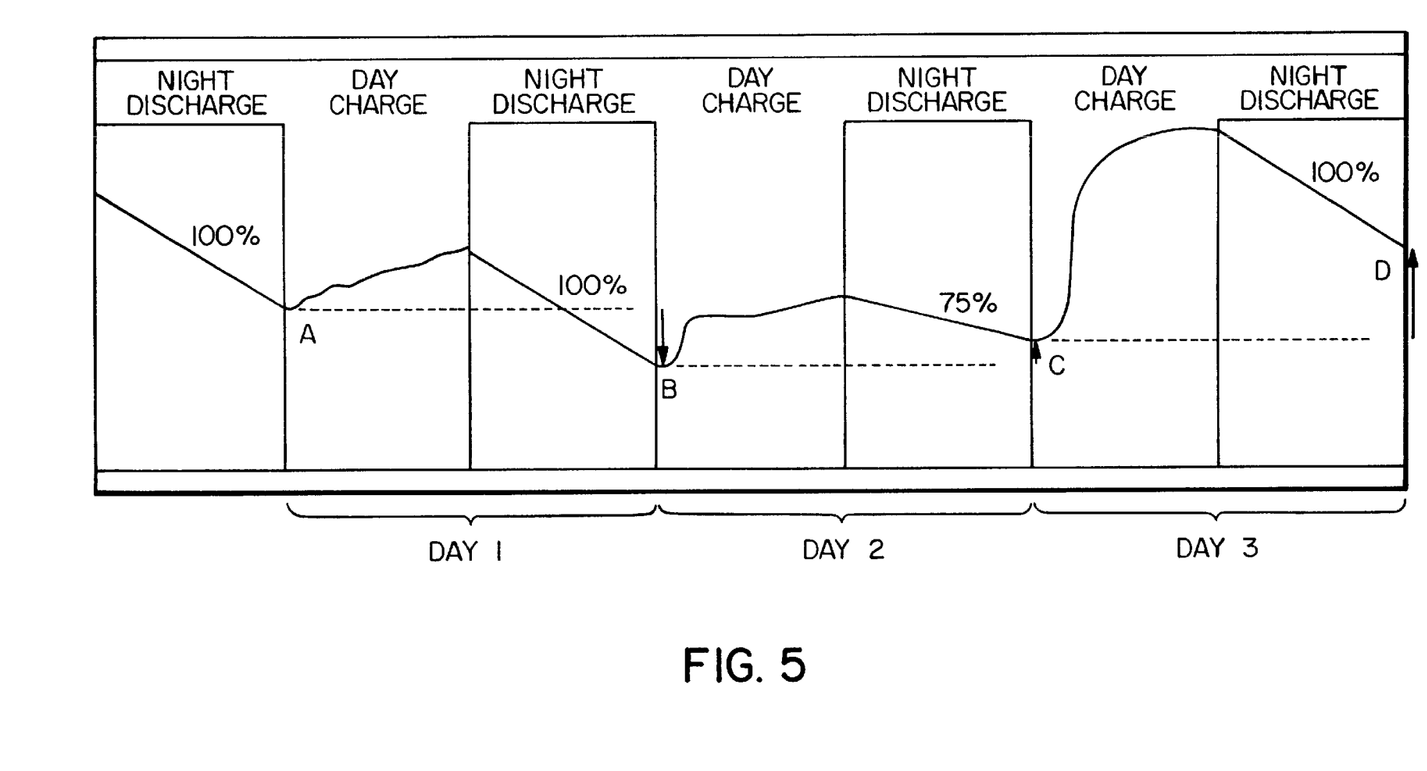
FIG. 5 is a schematic view showing the operation of the light assembly of the present invention over a number of days.

FIG. 5 is a schematic view showing the normal operation of a light assembly according to the present invention over three days. At time 1, the night before Day 1, the light assembly is flashing at the 100% output level.

After the night of operation, at the night/day transition at time 2, the battery voltage A is measured and stored. During Day 1, the battery pack is charged by the solar panels. At the day/night transition at time 3, the light assembly flashes to produce light at the 100% output level.

At the start of Day 2, at time 4 (dawn), the battery voltage B is measured and compared to the previous battery voltage A. Since B is lower than A, the output level of the light is lowered to 75%. In other words, there was not enough sunshine during Day 1 to recharge the battery pack and, therefore, the output level of the light assembly is set to a lower level to ensure continuous operation. The battery pack recharges over Day 2 due to absorbed solar energy, and begins flashing at time 5 (dusk) at a reduced light output level of 75%.

At the start of the Day 3, at time 6 (dawn), the battery voltage C is measured and compared to the previous day's voltage B. Since C is higher than B, the output level of the light assembly is set to 100% as there was sufficient sunshine during the previous day to recharge the battery pack. The battery pack recharges via solar energy over the course of Day 3. At time 7 (dusk), the light assembly begins operating at the 100% output level.

At the end of Day 3, at time 8 (dawn), the battery voltage D is measured. Voltage D is higher than C, however, since the output level of the light assembly is already at 100%, the light assembly remains set to flash at the maximum level over the next night period.

The present invention provides a solar-powered light assembly and a method of controlling the unit that permits automatic adjustment of the output of the unit to adapt to its solar environment. The main purpose of the control scheme is to keep the light output at the 100 percent level as much as possible. This enhancement provides a solar-powered light that can meet rigorous reliability requirements for applications such as maritime navigation and road way and aviation lighting where it is unacceptable for a light assembly to shut off due to insufficient solar energy for recharging.

Although the present invention has been described in some detail by way of example for purposes of clarity and understanding, it will be apparent that certain changes and modifications may be practised within the scope of the appended claims.

We claim:

1. A solar-powered light assembly comprising:
   at least one light-emitting diode (LED) powered by a rechargeable battery;
   a solar panel to recharge the battery and to sense light levels; and
   control circuitry to monitor the rechargeable battery at intervals to measure and store the current battery voltage as a stored battery voltage at the start of an interval and to set the at least one LED to output light at a pre-determined level based on a comparison of the current battery voltage with the stored battery voltage from the previous interval.

2. Apparatus as claimed in claim 1 in which the control circuitry monitors the rechargeable battery at intervals corresponding to the transition from night to day.

3. Apparatus as claimed in claim 1 in which the control circuitry activates the at least one LED to output at the pre-determined level only when the ambient light is below a pre-set level.

4. Apparatus as claimed in claim 1 in which:
   the control circuitry increases the output level of the at least one LED by a pre-determined amount, unless a maximum output level is already set, if the current battery voltage is greater by a pre-determined amount than the stored battery voltage from the previous interval;
   decreases the output level of the at least one LED by a pre-determined amount, unless a minimum output level is already set, if the current battery voltage is less by a pre-determined amount than the stored battery voltage from the previous interval; and
   maintains the output level of the at least one LED if the current battery voltage is the same as the stored battery voltage from the previous interval within a pre-determined range.

5. Apparatus as claimed in claim 1 in which the control circuitry provides a constant current from the battery to stabilize the light output of the at least one LED.

6. Apparatus as claimed in claim 1 in which the control circuitry activates the at least one LED to output light in pulses according to one or more flash patterns.

7. Apparatus as claimed in claim 6 in which the control circuitry communicates with a remote control sensor to permit remote changing of the flash pattern of the at least one LED.

8. Apparatus as claimed in claim 1 including a remote control receiver to permit remote control of the light assembly.

9. Apparatus as claimed in claim 8 in which the remote control receiver is an infrared sensor.

10. Apparatus as claimed in claim 8 in which the remote control receiver is a radio frequency sensor.

11. Apparatus as claimed in claim 1 in which the control circuitry activates the at least one LED to output light at a maximum level at the transition from day to night.

12. A method of controlling a solar-powered light assembly having at least one light-emitting diode (LED) powered by a rechargeable battery and a solar panel to recharge the battery and to sense light levels, comprising the steps of:
    monitoring the rechargeable battery at intervals by measuring and storing the battery voltage at the start of an interval;
    comparing the current battery voltage with the stored battery voltage from the previous interval; and
    setting the at least one LED to output light at a pre-determined level at the start of an interval based on results of the comparison step.

13. A method as claimed in claim 12 in which the step of monitoring the rechargeable battery at intervals involves measuring the voltage of the rechargeable battery at the time of the ambient light transition from night to day.

14. A method as claimed in claim 12 in which the at least one LED is set to output light only when the ambient light is below a pre-set level.

15. A method as claimed in claim 12 in which the step of setting the at least one LED to output light at a pre-determined level involves:
    increasing the output level of the at least one LED by a pre-determined amount, unless a maximum output level is already set, if the current battery voltage is greater by a pre-determined amount than the stored battery voltage from the previous interval;
    decreasing the output level of the at least one LED by a pre-determined amount, unless a minimum output level is already set, if the current battery voltage is less by a pre-determined amount than the stored battery voltage from the previous interval; and
    maintaining the output level of the at least one LED if the current battery voltage is the same as the stored battery voltage from the previous interval within a pre-determined range.

16. Apparatus as claimed in claim 12 in which the at least one LED is activated to output light in pulses according to one or more flash patterns.

* * * * *